O. C. LITTLE.
HUMIDIFIER.
APPLICATION FILED MAY 4, 1918.
1,312,997.
Patented Aug. 12, 1919.
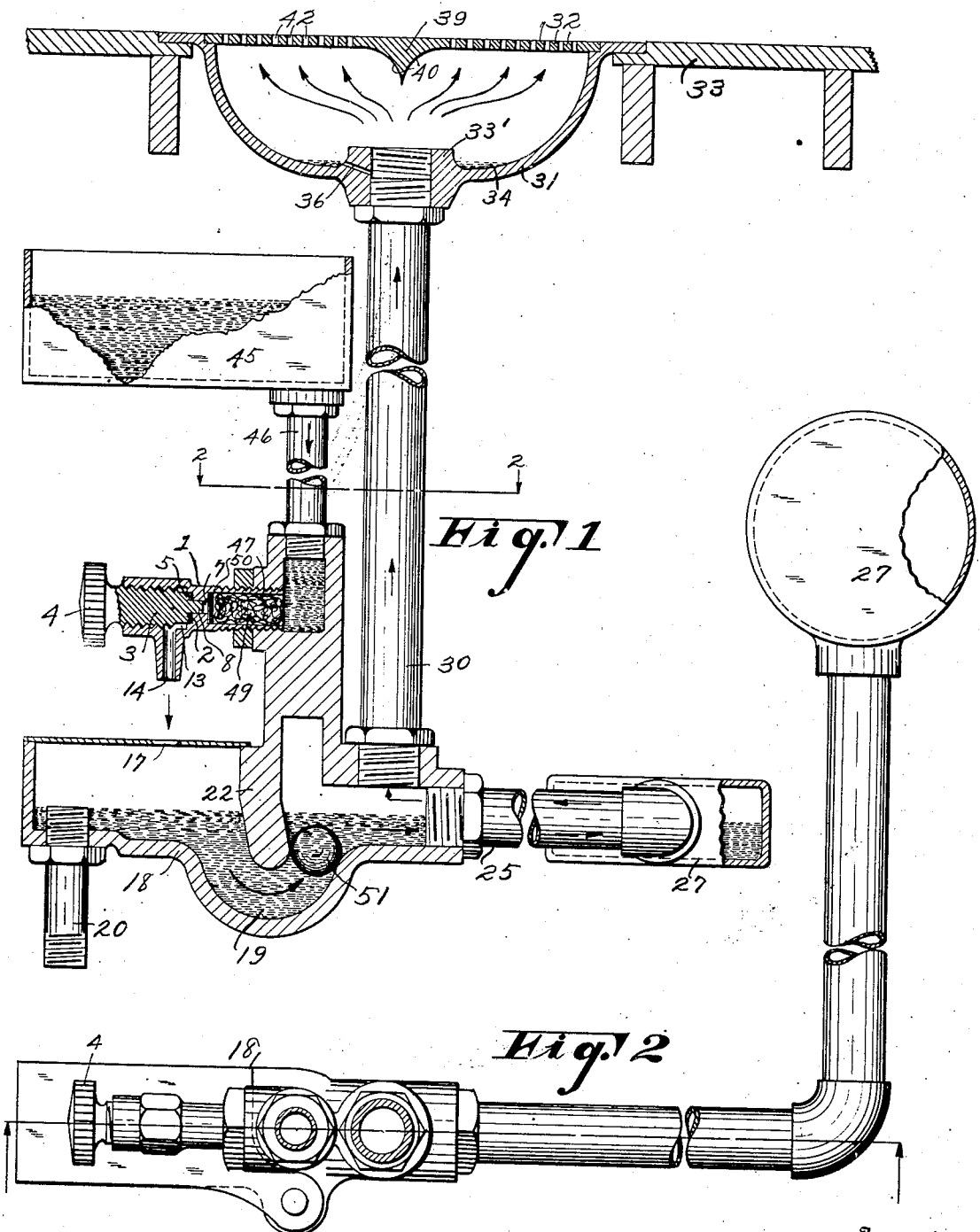
Witness
F. A. Otts
A. J. McKerihan
Inventor
Orson C. Little
By Enwin & Wheeler
Attorneys

UNITED STATES PATENT OFFICE.

ORTON C. LITTLE, OF MENASHA, WISCONSIN.

HUMIDIFIER.

1,312,997.     Specification of Letters Patent.     Patented Aug. 12, 1919.

Application filed May 4, 1918. Serial No. 232,667.

*To all whom it may concern:*

Be it known that I, ORTON C. LITTLE, a citizen of the United States, residing at Menasha, county of Winnebago, and State of Wisconsin, have invented new and useful Improvements in Humidifiers, of which the following is a specification.

My invention relates to improvements in humidifiers.

The object of my invention is to combine a valve capable of delivering water drop by drop at regular periods, and in definite quantity per hour, into a horizontally disposed passage leading to a vaporizing chamber exposed to heat sufficient to cause vaporization, and other conditions which permit the escape of vapor through the same passage to a duct leading to a suitable point of discharge, the capacity of the vaporizing chamber being proportioned substantially to the capacity of the drip aperture provided by the valve for delivery of liquid to the vaporizing chamber.

In the drawings:—

Figure 1 is an elevation, partly in vertical section, of a humidifier embodying my invention.

Fig. 2 is a plan view of the same, with the liquid supply and vapor delivery ducts shown in cross section, on line 2—2 of Fig. 1.

Fig. 3 is a plan view of the controlling member of the valve.

Like parts are identified by the same reference characters throughout the several views.

My improved valve comprises a casing 1, provided with an internal valve seat at 2. A screw threaded plug 3 having an operating handle 4 is seated in the casing with an interposed disk 5, which constitutes the valve proper, and which disk is held to its seat by the threaded plug 3. The valve seat is ported at 7, and the plug is preferably provided with a guide stem 8, which projects loosely into the port, but which permits a flow of liquid through the port to the valve disk 5.

The valve disk 5 is best shown in Fig. 3. It comprises a thin disk of brass, copper, or other suitable material, which will not readily corrode when exposed to water. It has a central aperture 9 to receive the guide stem 8, and a slot 10 extends radially from the central aperture 9 to the outer margin of the disk. The disk is also preferably cut away on one side, as shown at 11, whereby a segmental cavity is provided, into which water may discharge from the duct formed by the slot 10. This water is permitted to escape into an annular passage 13 formed by reducing the inner end of the plug 3 in such a manner that this passage will communicate with the discharge nozzle 14.

In the drawings, this discharge nozzle is pointed downwardly, and delivers the liquid through a hole 17 in a hollow fitting 18 provided with an intermediate trap 19. This fitting is provided with an overflow 20, the upper end of which projects upwardly from the bottom of the cavity within the fitting 18, and determines the maximum level of the liquid in the fitting.

The trap 19 is formed by a depression in the bottom wall of the fitting, and a coöperating partition 22. On the opposite side of this trap from that having the inlet aperture 17 a duct 25 is connected with the fitting, and this duct leads to a vaporizing chamber 27, the latter, together with the duct 25, being located in a horizontal plane, and at a level to receive water from the fitting before the accumulated water in the fitting reaches the top of outlet duct 20.

Preferably the central plane of the vaporizing chamber and of the duct 25 substantially coincides with the top of the outlet duct 20, whereby a material quantity of water may accumulate within the fitting, and within the vaporizing chamber, filling the cavity of the fitting and the vaporizing chamber about half full before water is permitted to discharge through the outlet.

A vapor duct 30 leads upwardly from the fitting 18, and is provided at its upper end with a bowl 31 having a grating 32, and adapted to be supported by a floor 33 of the room to which the vapor is to be delivered. The vapor duct 30 extends upwardly within the bowl for a short distance through a thickened portion, or stud 33′, the bowl having an annular depression 34 into which the water of condensation may be drained from the sides of the bowl, and returned to the fitting 18 through a duct 36.

The grating 32 is preferably provided with a solid central portion 39 having a deflecting projection 40 depending therefrom along the line of the axis of the duct 30, whereby the vapor will be distributed to the apertures 42 in the grating.

Water may be supplied to the drip valve from any suitable source of supply. In the drawings I have illustrated a supply tank 45, having a duct 46 leading downwardy and communicating with a passage 47, in an upwardly extending projection of the fitting 18. The valve casing screws into this passage, and at its inner end is provided with a cavity adapted to receive a suitable quantity of filtering material 49, a wire screen 50 being preferably employed to hold the filtering material away from the valve seat, and from the reduced port 7 in which the guide stem 8 is anchored.

When the valve is combined with the humidifier above described, the operation is as follows. Water delivered through the pipe 46 from tank 45, or other suitable source of supply, passes through the filtering material 49, and is allowed to drip in single drops through the nozzle 14 into the fitting 18, through the hole 17. The water accumulates within the fitting 18 until it flows into the vaporizing chamber 27. This chamber is shown small in the drawings, but it may be of any size suitable to the requirements. The size will, of course, be dependent upon the degree of heat to which it may be subjected. The vapor rising from the water in the vaporizing chamber 27 passes back through the duct 25 above the surface of the water therein, and upwardly through the duct 30 into the bowl 31, from which it escapes through the grate 32.

It will, of course, be understood that the vaporizing chamber may be located within a furnace, or at any other point where heat may be conveniently applied to it. The pipe 25 will extend through the furnace wall in a well known manner when the device is applied in that manner.

I preferably employ a ball 51 in the trap at the outlet side thereof, this ball serving as a valve, but not entirely closing the trap. The function of this ball valve is to prevent liquid from being blown out of the trap in case of a sudden excess of vapor from the vaporizing chamber. Otherwise, the liquid in the vaporizing chamber might, under some conditions, be converted into vapor so rapidly as to develop a slight pressure, and blow the liquid out of the trap, thereby allowing the vapor to pass to the inlet side of the receptacle.

I claim:

1. A humidifier including the combination of a drip valve, together with a receptacle provided with a trap, and arranged to receive liquid from the valve, a vaporizing chamber connected with the receptacle and having a flat bottom slightly below the normal level of liquid in the receptacle, a pipe connection between the vaporizing chamber and the portion of said receptacle on the opposite side of the trap from that into which the drip valve delivers, and a vapor outlet duct.

2. The humidifier including a liquid feeding receptacle, having an inlet and an outlet, and an intermediate trap, said receptacle being also provided with an overflow outlet at a higher level than the first mentioned outlet, a vaporizing chamber connected with the first mentioned outlet, and having a base adapted to support a quantity of liquid at the same level as the liquid in said receptacle without filling the vaporizing chamber or the intermediate connection, a vapor outlet leading upwardly from the receptacle adjacent to the connection of the vaporizing chamber, and means for slowly feeding water to said receptacle through the inlet.

3. A humidifier including the combination of a receptacle having at one end thereof water supply and overflow connections adapted for maintaining a liquid supply at a substantially constant level, an outlet duct at the other end of said receptacle, located partially above and partially below said level of the supply of liquid through the duct, and a vaporizing chamber in the same plane into which said outlet duct discharges, together with a vapor outlet duct adapted to receive and deliver vapor from the vaporizing chamber, and a baffle partition for said receptacle, adapted to prevent delivery of the vapor to the inlet and overflow end thereof.

4. A humidifier, including the combination of an elongated receptacle having a depression in the bottom thereof, and a partition extending downwardly into the depression to form a trap, said receptacle being open at the top at one side of the partition, and provided with a raised bottom portion having an outlet port therein, a vaporizing chamber connected with said receptacle at the other side of said partition, in the horizontal plane of said outlet port, and adapted to receive water from and return vapor to said receptacle through said connection, and a vapor outlet duct adapted to receive and convey vapor from the vaporizing chamber to the point of delivery, said receptacle being otherwise closed at that side of the partition to which the vaporizing chamber is connected.

5. A humidifier including the combination of a receptacle comprising a fitting having a top wall at one end, and open at the other end, exposed means for feeding water to the open end of said receptacle from a point above the receptacle, and at a predetermined constant rate of delivery, an outlet duct connected with the closed end of said receptacle, in a plane intermediate of the top and bottom of the receptacle throughout its length, a vaporizing chamber in the same plane, connected with the outlet duct, and a vapor outlet adapted to receive and convey vapor in an upward direction from the vaporizing chamber.

6. A humidifier including the combination of a receptacle comprising a fitting having a top wall at one end, and open at the other end, exposed means for feeding water to the open end of said receptacle from a point above the receptacle, and at a predetermined constant rate of delivery, an outlet duct connected with the closed end of said receptacle, in a plane intermediate of the top and bottom of the receptacle throughout its length, a vaporizing chamber, in the same plane, connected with the outlet duct, a vapor outlet adapted to receive and convey vapor in an upward direction from the vaporizing chamber, and a water outlet duct connected with the open end portion of said chamber in a position to limit the depth of liquid in said chamber and in the vaporizing chamber.

7. A humidifier including the combination of a water supply and a vapor outlet duct, a horizontally elongated fitting suspended from said duct, and having a top opening at one end, through which water may be allowed to drip from the water supply duct into the fitting, a partition partially dividing the fitting between its closed and open end portions, and a vaporizing chamber in communication with the closed end portion, said water outlet duct being provided with an outlet adapted for slow delivery of water to the open end of said fitting, and said vapor duct being adapted to receive vapor from the vaporizing chamber, said vaporizing chamber and fitting, together with their intervening connections, being all in substantially the same plane.

In testimony whereof I affix my signature in the presence of two witnesses.

ORTON C. LITTLE.

Witnesses:
O. C. WEBER,
A. J. MCKERIHAN.